US000001128H

United States Statutory Invention Registration [19]

[11] Reg. Number: H1128

Mallikarjun

[43] Published: Jan. 5, 1993

[54] HEAT RESISTANT THERMOPLASTIC COPOLYMERS

[75] Inventor: Ramesh Mallikarjun, West Chester, Pa.

[73] Assignee: ARCO Chemical Technology, Inc., Wilmington, Del.

[21] Appl. No.: 339,741

[22] Filed: Apr. 18, 1989

[51] Int. Cl.[5] ..... C08F 34/02
[52] U.S. Cl. ..... 526/271; 525/285
[58] Field of Search ..... 526/271; 525/285

[56] References Cited

U.S. PATENT DOCUMENTS 4,305,869 12/1981 Lee et al. ..... 260/45.95 R
4,341,695 7/1982 Lee et al. ..... 524/342
4,533,689 8/1985 Tayama et al. ..... 524/130

FOREIGN PATENT DOCUMENTS 57168908 3/1984 Japan .
61-23635 11/1986 Japan .
61-255913 11/1986 Japan ..... 212/8

*Primary Examiner*—Robert L. Stoll
*Assistant Examiner*—Joseph D. Anthony
*Attorney, Agent, or Firm*—Stephen D. Harper

[57] ABSTRACT

Thermoplastic copolymers having excellent tensile and heat resistance properties are obtained by copolymerization of a monovinyl aromatic monomer, an $\alpha,\beta$-unsaturated dicarboxylic acid anhydride, an $\alpha$, $\beta$-unsaturated carboxylic acid, and a $C_1$–$C_4$ alkyl ester of methacrylic acid. In a preferred embodiment, a styrene/maleic anhydride/methacrylic acid/methyl methacrylate random copolymer is prepared. Impact properties are improved by incorporation of an elastomer.

17 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HEAT RESISTANT THERMOPLASTIC COPOLYMERS

FIELD OF THE INVENTION

This invention pertains to thermoplastic resins. More particularly, this invention relates to moldable copolymers comprised of recurring units of a monovinyl aromatic monomer, an $\alpha,\beta$-unsaturated dicarboxylic acid anhydride, an $\alpha,\beta$-unsaturated carboxylic acid and a $C_1$–$C_4$ alkyl ester of methacrylic acid. This invention also pertains to methods for the preparation of such polymeric materials.

BACKGROUND OF THE INVENTION

A wide variety of engineering resins have been developed which are useful for the preparation of molded articles. The properties of the polymers are such that the resins may be used to replace metal in certain application. Heat resistance is a particularly critical property since in many applications the engineering resin must retain its mechanical properties and original form for prolonged periods at temperatures well above room temperature.

One type of engineering resin currently in widespread use is obtained by the copolymerization of styrene and maleic anhydride. These styrene/maleic anhydride copolymers contain from about 5 to 17 weight percent maleic anhydride and as a consequence have significantly higher heat resistance than polystyrene or acrylonitrile-butadiene-styrene (ABS) terpolymer. The maleic anhydride functionality also provides greatly improved adhesion to glass fiber, which is commonly used as a filler or reinforcement in the preparation of molded articles having high tensile strength and stiffness.

However, despite the generally satisfactory properties of the styrene/maleic anhydride copolymers, in certain applications it would be desirable to increase the heat resistance and tensile strength of these copolymers. These desired improvements in properties cannot be achieved simply by increasing the proportion of maleic anhydride because of the very high chain transfer activity of maleic anhydride and the marked tendency of the styrene/maleic anhydride system to form a low molecular weight alternating copolymer.

Accordingly, an object of the present invention is to provide thermoplastic resins having tensile strengths which are superior to comparable styrene/maleic anhydride copolymers.

A further object is to provide moldable plastics which have improved flexural strength relative to comparable styrene/maleic anhydride copolymers.

Still another object is to provide engineering resins having improved heat resistance.

SUMMARY OF THE INVENTION

It has now been discovered that the tensile strength, flexural strength, and heat resistance of a styrene/maleic anhydride copolymer are unexpectedly improved when relatively minor amounts of an $\alpha,\beta$-unsaturated carboxylic acid and a $C_1$ to $C_4$ alkyl ester of methacrylic acid are incorporated into the copolymer. In addition, the presence of the methacrylate monomer during copolymerization surprisingly increases the rate of polymerization and promotes the formation of higher molecular weight copolymer.

This invention provides a thermoplastic copolymer comprising from about 40 to 97 weight percent of recurring units of a monovinyl aromatic monomer, from about 1 to 30 weight percent of recurring units of an $\alpha,\beta$-unsaturated dicarboxylic acid anhydride, from 1 to 30 weight percent of recurring units of an $\alpha,\beta$-unsaturated carboxylic acid, and from 1 to 40 weight percent of recurring units of a $C_1$–$C_4$ alkyl ester of methacrylic acid.

In another embodiment, this invention provides a resin composition comprising the thermoplastic copolymer and from about 1 to 35 parts by weight of an elastomer per 100 parts by weight of the thermoplastic copolymer. The elastomer improves the impact strength of the thermoplastic copolymer, yielding a resin with reduced brittleness.

This invention additionally provides a method for producing the thermoplastic copolymer comprising copolymerizing a monovinyl aromatic monomer, an $\alpha,\beta$-unsaturated dicarboxylic acid anhydride, an $\alpha,\beta$-unsaturated carboxylic acid, and a $C_1$–$C_4$ alkyl ester of methacrylic acid, wherein the resulting thermoplastic copolymer is comprised of (a) from about 40 to 97 weight percent of recurring units of the monovinyl aromatic monomer, (b) from about 1 to 30 weight percent of recurring units of the $\alpha,\beta$-unsaturated dicarboxylic acid anhydride, (c) from about 1 to 30 weight percent of recurring units of the $\alpha,\beta$-unsaturated carboxylic acid, and (d) from about 1 to 40 weight percent of recurring units of the $C_1$–$C_4$ alkyl ester of methacrylic acid. In a preferred embodiment, the copolymerization is carried out in the presence of an elastomer, preferably one having at least one ethylenically unsaturated functional group.

DETAILED DESCRIPTION OF THE INVENTION

The thermoplastic copolymer of this invention is a substantially random copolymer comprised of recurring units of (a) from about 40 to 97 weight percent, preferably from about 40 to 74 weight percent, most preferably from about 41 to 61 weight percent, of a monovinyl aromatic monomer, (b) from about 1 to 30 weight percent, preferably from about 5 to 20 weight percent, most preferably from about 12 to 17 weight percent, of an $\alpha,\beta$-unsaturated dicarboxylic acid anhydride, (c) from about 1 to 30 weight percent, preferably from about 3 to 12 weight percent, most preferably from about 4 to 8 weight percent, of an $\alpha,\beta$-unsaturated carboxylic acid and (d) from about 1 to 40 weight percent, preferably from about 18 to 35 weight percent, most preferably from about 26 to 33 weight percent of a $C_1$–$C_4$ alkyl ester of methacrylic acid.

The number average molecular weight of the copolymer of the present invention generally must be at least about 25,000 in order to develop adequate physical properties. Most preferably, the number average molecular weight is from about 50,000 to 120,000.

The monovinyl aromatic monomers suitable for use in the thermoplastic copolymers of this invention include any of the addition polymerizable monomers in which a carbon-carbon double bond is attached directly to an aromatic ring. Suitable monovinyl aromatic monomers include, but are not limited to, styrene, $\alpha$-methylstyrene, ar-methyl styrene, ar-ethyl styrene, ar-chlorostyrene, ar-bromostyrene, ar-(t-butyl)styrene, ar-cyanostyrene, ar-vinyl naphthalene, and mixtures thereof. The preferred monovinyl aromatic monomer is styrene.

The $\alpha,\beta$-unsaturated dicarboxylic acid anhydride may be any such monomer capable of copolymerization with the other comonomers comprising the copolymers of this invention. Examples of suitable $\alpha,\beta$-unsaturated dicarboxylic acid anhydrides include maleic anhydride, chloromaleic anhydride, citraconic anhydride, tetrahydrophthalic anhydride, itaconic anhydride, ethyl maleic anhydride, bromomaleic anhydride, methyl itaconic anhydride, and mixtures thereof. Maleic anhydride is the preferred $\alpha,\beta$-unsaturated dicarboxylic acid anhydride.

The $\alpha,\beta$-unsaturated carboxylic acids suitable for use in the thermoplastic copolymers of this invention contain a carbon-carbon double bond in conjunction with a carboxylic acid functionality, wherein the double bond is capable of addition polymerization with the other monomers. The preferred $\alpha,\beta$-unsaturated carboxylic acid is methacrylic acid, although acrylic acid or a mixture of acrylic acid and methacrylic acid may also be used.

Suitable methacrylates include the $C_1$–$C_4$ alkyl esters of methacrylic acid, such as methacrylate, ethyl methacrylate, propyl methacrylate, iso-propyl methacrylate, iso-butyl methacrylate, sec-butyl methacrylate, t-butyl methacrylate and mixtures thereof. The $C_1$–$C_3$ alkyl esters of methacrylic acid are preferred. Methyl methacrylate is a particularly preferred methacrylate monomer.

A particularly preferred embodiment of this invention is a copolymer comprised of recurring units of styrene, maleic anhydride, methacrylic acid, and methyl methacrylate. Examples of other embodiments of the thermoplastic copolymer of this invention include, but are not limited to, styrene/citraconic anhydride/methacrylic acid/methyl methacrylate, p-(t-butyl) styrene/maleic anhydride/methacrylic acid/-methyl methacrylate, styrene/p-methyl styrene/maleic anhydride/methacrylic acid/methyl methacrylate, styrene/chloromaleic anhydride/maleic anhydride/methacrylic acid/methyl methacrylate, styrene/maleic anhydride/acrylic acid/methyl methacrylate, styrene/-maleic anhydride/methacrylate acid/iso-propyl methacrylate, styrene/maleic anhydride/methacrylic acid/t-butyl methacrylate/methyl methacrylate, and the like.

In one embodiment of this invention, a resin composition is provided which is comprised of the thermoplastic copolymer described herein and an elastomer. The elastomer improves the impact strength of the copolymer, which in the absence of the elastomer tends to be somewhat brittle. The elastomer is a relatively soft, flexible polymer having a glass transition temperature below about 0° C. Most preferably, the glass transition temperature is below about −30° C. The elastomer may be blended with the thermoplastic copolymer following copolymerization either in a dry form or with one or both components dissolved in a solvent. Preferably, however, the elastomer is present in the reaction mixture while the mixture of monomers is copolymerized. It is particularly preferred that the elastomer contain at least one ethylenically unsaturated functional group per elastomer chain which is capable of grafting onto the random copolymer during copolymerization. The grafting appears to promote uniform dispersion of the elastomer through the copolymer, thereby maximizing the improvement in impact properties. The elastomer is preferably present in the form of small particles dispersed in the copolymer continuous phase wherein the particles have an average diameter of less than about 10 microns. An average elastomer particle diameter in the range of from about 1 to 5 microns is preferred. Mixtures of elastomers may be used. For example, one elastomer may be added during the copolymerization and a second elastomer blended with the product after copolymerization is completed.

Suitable elastomers include, but are not limited to, conjugated diene polymers, random or block copolymers of a conjugated diene and a monovinyl aromatic monomer, random copolymers of a conjugated diene and an unsaturated nitrile, terpolymers of ethylene, propylene, and a diene (EDPM type elastomers), hydrogenated random copolymers of a conjugated diene and a monovinyl aromatic monomer and hydrogenated block copolymers of a conjugated diene and a monovinyl aromatic monomer. The preferred conjugated dienes include butadiene and isoprene, while the preferred monovinyl aromatic monomer is styrene. Acrylonitrile is the preferred unsaturated nitrile. Methods of preparing elastomers of these types are described in *Kirk-Othmer Encyclopedia of Chemical Technology* vol. 8, pp. 446–640, John Wiley, New York (1978), the teachings of which are incorporated herein by reference.

The amount of elastomer employed is from about 1 to 35 parts by weight per 100 parts by weight of the thermoplastic copolymer. The elastomer content is preferably from about 5 to 25, most preferably from about 14 to 21, parts by weight per 100 parts by weight of the thermoplastic copolymer. Low levels of elastomer may be insufficient to enhance the impact strength of the copolymer, while high levels may adversely affect the heat resistance and tensile properties of the resin composition.

Preparation of the thermoplastic copolymers of this invention may be accomplished by random copolymerization of the component monomers. In a preferred embodiment, the monomers are reacted in the presence of an effective amount of a free radical initiator until substantial conversion to copolymer is achieved. Suitable free radical initiators include, but are not limited to, azo compounds such as azobisisobutyronitrile, diacyl peroxides such as benzoyl peroxide, dialkyl peroxides such as di-t-butyl peroxide, peresters such as t-butyl perbenzoate, peroxalates such as di-isopropyl peroxydicarbonate, hydroperoxides such as t-butyl hydroperoxide, as well as persulfates and percarbonates. Mixtures of initiators may also be used. Benzoyl peroxide is a preferred initiator. The concentration of initiator may be any amount effective to accomplish copolymerization, preferably between about 0.1 and 5.0 weight percent based on total monomer.

The copolymerization may be performed in bulk, in solution, or in suspension using either a batch, semi-continuous, or continuous process. In a preferred embodiment, the copolymerization is carried out in a continuous fashion in bulk so that under steady state conditions the concentration of copolymer in the polymerization mixture is from about 30 to 60%. The unreacted monomers thus serve as a solvent for the process. Generally, reaction temperatures between about 50° and 150° C. are preferred. The reaction time required is not critical and can vary depending on the conditions used and the extent of monomer conversion desired. The monomers may be combined in a suitable reactor vessel in any order, provided that a substantially random copolymer is obtained. Since the monomers may have different reactivities, it may be advantageous to use different rates of addition for the various monomers to ensure uniformity of the copolymer product. Moreover, if a process is used in which less than complete conversion of the monomers is accomplished, the composition of the final product may be somewhat different than the monomer feed composition. The feed composition can be adjusted to obtain the desired monomer ratio in the final copolymer.

It may be useful to conduct the bulk copolymerization in the presence of a small amount (typically, from about 1 to 10 parts per 100 parts monomer) of a solvent in order to reduce the viscosity of the mixture. Suitable solvents include, for example, aromatic hydrocarbons such as toluene and ethylbenzene and aliphatic ketones such as methyl ethyl ketone. Methyl ethyl ketone is the preferred solvent.

Following copolymerization, the copolymer or resin composition of this invention may be recovered by any of the methods known in the art for separating a polymer from a crude reaction mixture. For example, the copolymer may be precipitated from solution by adding a non-solvent such as isopropyl alcohol. The precipitated copolymer can then be isolated by filtration. Typically, any solvent or unreacted monomer present can be removed from the copolymer in a drying step. The dried copolymer may be pelletized or otherwise processed into a form suitable for use in the contemplated application.

The thermoplastic copolymers or resin compositions of this invention may be molded into useful articles using any of the techniques well-established for the utilization of engineering resins in general, including injection molding, extrusion, molding foam-injection molding, blow-molding, thermo-forming, foam-molding of impregnated beads, spinning, rotation molding, and the like. The thermoplastic copolymer may be combined with additives such as glass fibers, fillers, UV stabilizers, anti-oxidants, pigments, plasticizers, as well as other substances. Additionally, the copolymer can be blended with other thermoplastic resins to form useful blends and alloys.

The following examples are illustrative of, but not in limitation of, the present invention.

EXAMPLES

Preparation of Thermoplastic Copolymers—General Procedure

The copolymers shown in Table I were prepared in a continuous process by copolymerization of the component monomers in a 1.6 liter jacketed CSTR (Continuously Stirred Tank Reactor). Table I indicates the compositions of the final copolymers obtained rather than the amount of each monomer present in the feed mixtures. All runs were carried out at 100° C. using benzoyl peroxide as initiator. The benzoyl peroxide was introduced as a 1% solution in styrene; the rate of initiator feed into the CSTR was varied to maintain the rate of polymerization between about 5 to 8 percent conversion per hour and to achieve a steady state polymer (solids) concentration of about 50 percent. The monomers and Stereon ® 721 (a graded block styrene-butadiene elastomer containing about 10 percent styrene; a product of Firestone Synthetic Rubber and Latex) were simultaneously fed into the CSTR. The feed rate was adjusted to about 600 mL/hour under steady state conditions to obtain an average residence time of about 2.8 hours and a product rate of about 1.25 lb/hour at the desired solids level. Methyl ethyl ketone (4–5 parts per 100 parts of copolymer) was used as a solvent to reduce the viscosity of the polymerization mixture.

The resulting viscous syrup was blended with isopropyl alcohol to precipitate the thermoplastic copolymer as a fine white powder. The powder was separated from the isopropyl alcohol/unreacted monomer solution by filtration and air-dried for 24 hours. Additional residual styrene was removed by drying in a 70° C. vacuum oven at 25–50 torr for 10 hours.

The dried powder was then extruded and pelletized on a 1" Sterling single screw extruder with one vent. The temperature profile on the extruder barrels was set to a flat 480° F. with the vacuum vent section at 100 torr. The pellets were re-extruded to reduce the level of residual styrene to less than 2500 ppm.

After drying at 170° F. for 4 hours, the pellets were injection molded in a 30 ton, 2 oz. Battenfeld machine at a melt temperature of 480° F. The mold temperature was 140° F. The physical properties of the molded specimens were measured using standard ASTM test methods.

EXAMPLE 1

This example (Table I) demonstrates the preparation of one particular embodiment of the resin composition of this invention containing 51 weight percent styrene, 14 weight percent maleic anhydride, 6 weight percent methacrylic acid, 29 weight percent methyl methacrylate, and 18 parts by weight per 100 parts copolymer of elastomer (Stereon ®721). An excellent overall balance of properties was exhibited by the resin thus obtained.

COMPARATIVE EXAMPLE 2

To show the superior physical properties of the thermoplastic copolymer of this invention, an impact-modified copolymer containing only styrene and maleic anhydride was prepared for comparative purposes. The tensile strength, elongation at break, flex strength, and heat resistance of this product were significantly inferior to the copolymer of Example 1, which contained styrene, maleic anhydride, methacrylic acid, and methyl methacrylate.

COMPARATIVE EXAMPLE 3

To demonstrate that the incorporation of methacrylic acid substantially contributes to the desirable properties of the thermoplastic copolymer of this invention, a terpolymer containing only styrene, maleic anhydride, and methyl methacrylate was prepared. Table I indicates that the tensile and flex strength of the terpolymer were considerably lower than the corresponding properties of the copolymer of Example 1. The terpolymer also exhibited poorer resistance to heat sag than the copolymer of the present invention.

COMPARATIVE EXAMPLE 4

A terpolymer containing only styrene, maleic anhydride, and methacrylic acid was prepared to show that certain properties are deficient if methyl methacrylate is not present. The data in Table 1 indicate that although the terpolymer has a DTUL comparable to that of the copolymer of Example 1, the tensile strength, elongation, flex strength, and flex modulus are lower.

While preferred embodiments and examples have been described, it will be apparent to those skilled in the art that various modification may be made without deviating from the inventive concepts defined in the following claims.

TABLE I

| Example | 1 | 2* | 3* | 4* |
|---|---|---|---|---|
| Styrene, wt. %[1] | 51 | 86 | 74 | 80 |
| Maleic Anhydride, wt. %[1] | 14 | 14 | 14 | 14 |
| Methacrylic Acid, wt. %[1] | 6 | 0 | 0 | 6 |
| Methyl Methacrylate, wt. %[1] | 29 | 0 | 12 | 0 |
| Stereon ® 721, phr | 18 | 18 | 18 | 18 |
| Tensile Strength | | | | |
| at yield (psi) | 7850 | 6630 | 6800 | 6970 |
| at break (psi) | 6420 | 5750 | 5410 | 5850 |
| Elongation at Break, % | 59 | 40 | 42 | 30 |
| Flex Strength at Yield, psi | 13,600 | 11,860 | 11,630 | 12,230 |
| Flex Modulus, psi × $10^3$ | 372 | 370 | 355 | 363 |
| DTUL (°F.) (⅛", 264 psi, unannealed) | 233 | 218 | 216 | 235 |
| Notched Izod, ft-lb/in | 3.2 | 3.4 | 3.1 | 2.9 |
| Penetration Impact, Total Energy ft-lbs | 10.5 | 12.3 | 12.5 | 11.0 |

*Comparative examples
[1]Composition of final product

I claim:

1. A thermoplastic copolymer comprised of
(a) from about 40 to 97 weight percent of recurring units of a monovinyl aromatic monomer;
(b) from about 1 to 30 weight percent of recurring units of an $\alpha,\beta$-unsaturated dicarboxylic acid anhydride;
(c) from about 1 to 30 weight percent of recurring units of an $\alpha,\beta$-unsaturated carboxylic acid; and
(d) from about 1 to 40 weight percent of recurring units of a $C_1$–$C_4$ alkyl ester of methacrylic acid;
wherein the thermoplastic copolymer has a substantially random structure.

2. The thermoplastic copolymer of claim 1 wherein the monovinyl aromatic monomer is selected from the group consisting of styrene, $\alpha$-methylstyrene, ar-methyl styrene, ar-ethyl styrene, ar-chlorostyrene, ar-bromostyrene, ar-(t-butyl)styrene, ar-cyano-styrene, ar-vinyl naphthalene, and mixtures thereof.

3. The thermoplastic copolymer of claim 1 wherein the $\alpha,\beta$-unsaturated dicarboxylic acid anhydride is selected from the group consisting of maleic anhydride, chloromaleic anhydride, citraconic anhydride, tetrahydrophthalic anhydride, itaconic anhydride, ethyl maleic anhydride, bromomaleic anhydride, methyl itaconic anhydride, and mixtures thereof.

4. The thermoplastic copolymer of claim 1 wherein the $\alpha,\beta$-unsaturated carboxylic acid is selected from the group consisting of acrylic acid and methacrylic acid.

5. The thermoplastic copolymer of claim 1 wherein the $C_1$–$C_4$ alkyl ester of methacrylic acid is selected from the group consisting of methyl methacrylate, ethyl methacrylate, propyl methacrylate, iso-propyl methacrylate, isobutyl methacrylate, sec-butyl methacrylate, t-butyl methacrylate and mixtures thereof.

6. A thermoplastic copolymer comprised of
(a) from about 40 to 74 weight percent of recurring units of styrene;
(b) from about 5 to 20 weight percent of recurring units of maleic anhydride;
(c) from about 3 to 12 weight percent of recurring units of methacrylic acid; and
(d) from about 18 to 35 weight percent of recurring units of methyl methacrylate;
wherein the thermoplastic copolymer has a substantially random structure.

7. A molded article produced by molding the thermoplastic copolymer of claim 1.

8. A molded article produced by molding the thermoplastic copolymer of claim 6.

9. A process for producing a thermoplastic copolymer having a substantially random structure comprising copolymerizing a monovinyl aromatic monomer, an $\alpha,\beta$-unsaturated dicarboxylic acid anhydride, an $\alpha,\beta$-unsaturated carboxylic acid, and a $C_1$–$C_4$ alkyl ester of methacrylic acid, wherein the resulting thermoplastic copolymer is comprised of
(a) from about 40 to 97 weight percent of recurring units of the monovinyl aromatic monomer;
(b) from about 1 to 30 weight percent of recurring units of the $\alpha,\beta$-unsaturated dicarboxylic acid anhydride;
(c) from about 1 to 30 weight percent of recurring units of the $\alpha,\beta$-unsaturated carboxylic acid; and
(d) from about 1 to 40 weight percent of recurring units of the $C_1$–$C_4$ alkyl ester of methacrylic acid.

10. The process of claim 9 wherein the copolymerization is carried out in the presence of an effective amount of a free-radical initiator.

11. The process of claim 9 wherein the monovinyl aromatic monomer is selected from the group consisting of styrene, $\alpha$-methylstyrene, ar-methyl styrene, ar-ethyl styrene, ar-chlorostyrene, ar-bromostyrene, ar-(t-butyl)styrene, ar-cyanostyrene, ar-vinyl naphthalene, and mixtures thereof.

12. The process of claim 9 wherein the $\alpha,\beta$-unsaturated dicarboxylic acid anhydride is selected from the group consisting of maleic anhydride, chloromaleic anhydride, citraconic anhydride, tetrahydrophthalic anhydride, itaconic anhydride, ethyl maleic anhydride, bromomaleic anhydride, methyl itaconic anhydride, and mixtures thereof.

13. The process of claim 9 wherein the $\alpha,\beta$-unsaturated carboxylic acid is selected from the group consisting of acrylic acid and methacrylic acid.

14. The process of claim 9 wherein the $C_1$–$C_4$ alkyl ester of methacrylic acid is selected from the group consisting of methyl methacrylate, ethyl methacrylate, propyl methacrylate, iso-propyl methacrylate, isobutyl methacrylate, sec-butyl methacrylate, t-butyl methacrylate and mixtures thereof.

15. A process for producing a thermoplastic copolymer having a substantially random structure comprising copolymerizing styrene, maleic anhydride, methacrylic acid, and methyl methacrylate in the presence of an effective amount of a free-radical initiator, wherein the resulting thermoplastic copolymer is comprised of
(a) from about 40 to 74 weight percent of recurring units of styrene;

(b) from about 5 to 20 weight percent of recurring units of maleic anhydride;

(c) from about 3 to 12 weight percent of recurring units of methacrylic acid; and (d) from about 18 to 35 weight percent of recurring units of methyl methacrylate.

16. The process of claim 9 wherein the copolymerization is performed in a continuous manner.

17. A process for producing a molded article comprising molding the thermoplastic copolymer of claim 1.

* * * * *